(12) United States Patent
Hodgman et al.

(10) Patent No.: US 11,290,479 B2
(45) Date of Patent: Mar. 29, 2022

(54) DETERMINING INSIGHTS IN AN ELECTRONIC ENVIRONMENT

(71) Applicant: Rapid7, Inc., Boston, MA (US)

(72) Inventors: Roy Hodgman, Cambridge, MA (US); Wah-Kwan Lin, Melrose, MA (US); Vasudha Shivamoggi, Cambridge, MA (US)

(73) Assignee: Rapid7, Inc., Boston, MA (US)

( * ) Notice: Subject to any disclaimer, the term of this patent is extended or adjusted under 35 U.S.C. 154(b) by 349 days.

(21) Appl. No.: 16/101,437

(22) Filed: Aug. 11, 2018

(65) Prior Publication Data

US 2020/0053115 A1 Feb. 13, 2020

(51) Int. Cl.
*H04L 41/12* (2022.01)
*G06F 16/28* (2019.01)
*G06F 16/2457* (2019.01)
*H04L 29/06* (2006.01)

(52) U.S. Cl.
CPC ...... *H04L 63/1433* (2013.01); *H04L 63/1441* (2013.01); *H04L 63/20* (2013.01); *G06F 16/24578* (2019.01); *G06F 16/285* (2019.01); *H04L 41/12* (2013.01)

(58) Field of Classification Search
CPC . H04L 63/1433; H04L 63/1441; H04L 63/20; H04L 41/12; H04L 63/1425; H04L 63/1416; H04L 63/1408; H04L 63/14; G06F 16/285; G06F 16/24578
See application file for complete search history.

(56) References Cited

U.S. PATENT DOCUMENTS

| | | | |
|---|---|---|---|
| 8,020,210 B2 * | 9/2011 | Tippett | H04L 63/1416 726/25 |
| 9,069,853 B2 * | 6/2015 | Stading | G06F 16/93 |
| 9,378,361 B1 * | 6/2016 | Yen | G06F 21/55 |
| 9,516,053 B1 * | 12/2016 | Muddu | G06F 16/285 |
| 10,178,119 B1 * | 1/2019 | Brandwine | H04L 67/02 |
| 10,181,039 B1 * | 1/2019 | Ranjan | G06F 16/9535 |
| 10,417,613 B1 * | 9/2019 | Brisebois | G06Q 10/1095 |
| 2002/0046275 A1 * | 4/2002 | Crosbie | G06F 21/552 709/224 |
| 2010/0275263 A1 * | 10/2010 | Bennett | G06F 21/577 726/25 |

(Continued)

FOREIGN PATENT DOCUMENTS

CN 108399194 A * 8/2018
KR 100838799 B1 * 6/2008

(Continued)

*Primary Examiner* — Techane Gergiso
(74) *Attorney, Agent, or Firm* — Ashwin Anand

(57) ABSTRACT

Approaches provide for securing an electronic environment. A threat analysis service can obtain data for devices, users, and threats from disparate sources and can correlate users to devices and threats to build an understanding of an electronic environment's operational, organizational, and security concerns in order to provide customized security strategies and remediations. Additionally, the threat analysis service can develop a model of an electronic environment's behavior by monitoring and analyzing various the data from the data sources. The model can be updated such that the threat analysis service can tailor its orchestration to complement existing operational processes.

20 Claims, 6 Drawing Sheets

(56) References Cited

U.S. PATENT DOCUMENTS

| | | | | |
|---|---|---|---|---|
| 2012/0185945 | A1* | 7/2012 | Andres | G06F 21/56 726/25 |
| 2012/0304007 | A1* | 11/2012 | Hanks | G05B 23/0216 714/26 |
| 2013/0124529 | A1* | 5/2013 | Jacob | G06F 9/44505 707/740 |
| 2013/0298244 | A1* | 11/2013 | Kumar | H04L 67/10 726/25 |
| 2013/0340084 | A1* | 12/2013 | Schrecker | H04L 63/00 726/25 |
| 2015/0347751 | A1* | 12/2015 | Card | H04L 63/20 726/23 |
| 2016/0149943 | A1* | 5/2016 | Kaloroumakis | H04L 63/1425 726/23 |
| 2016/0154960 | A1* | 6/2016 | Sharma | G06F 21/577 726/25 |
| 2016/0164895 | A1* | 6/2016 | Satish | H04L 63/1425 726/1 |
| 2017/0063894 | A1* | 3/2017 | Muddu | G06K 9/2063 |
| 2017/0149807 | A1* | 5/2017 | Schilling | G06F 21/56 |
| 2017/0171231 | A1* | 6/2017 | Reybok, Jr. | H04L 63/14 |
| 2017/0251013 | A1* | 8/2017 | Kirti | H04L 63/1408 |
| 2017/0286671 | A1* | 10/2017 | Chari | G06F 21/552 |
| 2017/0295190 | A1* | 10/2017 | Brown | H04L 63/20 |
| 2017/0332238 | A1* | 11/2017 | Bansal | H04L 63/0272 |
| 2017/0353477 | A1* | 12/2017 | Faigon | H04L 63/1416 |
| 2018/0004948 | A1* | 1/2018 | Martin | G06F 21/552 |
| 2018/0089258 | A1* | 3/2018 | Bhattacharjee | G06F 16/2272 |
| 2018/0159751 | A1* | 6/2018 | Zhang | H04L 63/0227 |
| 2018/0191781 | A1* | 7/2018 | Palani | G06F 21/554 |
| 2018/0255099 | A1* | 9/2018 | Chen | H04L 67/10 |
| 2018/0285777 | A1* | 10/2018 | Li | G06Q 10/06 |
| 2018/0357556 | A1* | 12/2018 | Rai | G06N 20/00 |
| 2020/0007391 | A1* | 1/2020 | Yang | G06N 20/00 |
| 2020/0019889 | A1* | 1/2020 | Keanini | H04L 63/1408 |
| 2020/0028862 | A1* | 1/2020 | Lin | H04L 63/1441 |

FOREIGN PATENT DOCUMENTS

| | | | | |
|---|---|---|---|---|
| WO | WO-2014094151 | A1* | 6/2014 | H04L 51/14 |
| WO | WO-2018077035 | A1* | 5/2018 | H04L 29/06 |

* cited by examiner

DETERMINING INSIGHTS IN AN ELECTRONIC ENVIRONMENT

TECHNICAL FIELD

Embodiments of this disclosure relate generally to a system for analyzing data from disparate sources and determining insights and a method of analyzing the data, and more specifically to methods and systems for automatically performing an action in response to a security threat or other activity.

BACKGROUND

As an increasing number of applications and services are being made available over networks such as the internet, monitoring these networks is important to ensure reliable operation, fault detection, timely mitigation of potentially malicious activities, etc.

Conventional systems rely on a combination of human resources and partially automated systems to perform security management, ad hoc data mingling, alert curation, and organizational understanding. However, oftentimes it is difficult to detect risks, or at least detect such risks before the threat can be spread to a significant portion of the resource environment.

A need exists, therefore, for systems, methods, and devices that overcome this disadvantage.

SUMMARY

This summary is provided to introduce a selection of concepts in a simplified form that are further described below in the Detailed Description. This summary is not meant or intended to identify or exclude key features or essential features of the claimed subject matter, nor is it intended to be used as an aid in determining the scope of the claimed subject matter.

In one aspect, embodiments relate to a computing system that includes at least one computing device processor, wherein the at least one computing device processor enables the computing system to cause at least one data store in a service provider environment to maintain at least three data sets from a plurality of data sources, each data set including information for one of assets, users, or security threats; correlate at least one entry in a first data set with a second data set of the three data sets; receive a query associated with a subject, the subject being at least one of an asset, a user, or a security threat; determine a correlator of a set of correlators based at least in part on the subject; identify at least one of an asset, a user, or security threat associated with the subject; and perform a security action affecting the subject and an identified one of the asset, the user, or the security threat.

In some embodiments, the system further comprises an interface configured to obtain the at least three data sets, wherein the at least three data sets include at least an asset data set, a user data set, and a threat data set, and wherein the asset data set includes first identification information identifying individual devices on a network, the user data set includes second identifying information identifying user accounts associated with the individual devices, and the threat data set includes third identification information identifying threats to one of a device or an user account.

In some embodiments, the system further comprises an asset classifier for classifying an asset as one of a physical asset or a role asset, a user classifier for classifying a user as being associated with one of an employee type, a group type, or a role type, and a threat classifier for classifying a threat into one of a target threat, an actor threat, or an activity threat.

In some embodiments, the at least one of the asset classifier, the user classifier, or the threat classifier is applied to incoming data prior to storage in one of the at least three data stores.

In some embodiments, the at least one of the asset classifier, the user classifier, or the threat classifier is applied to data in one of the at least three data stores.

In some embodiments, the query is against a classification for one of an asset, a user, or a threat.

In some embodiments, the system further comprises an asset to threat correlator that utilizes vulnerability definition data to correlate an asset to a threat; a user to threat correlator for correlating a user to a threat; and an asset to user correlator that uses at least authentication data to correlate an asset to a user.

In some embodiments, the system further comprises an insight recommending component configured to generate a report including an indication of at least one of a security action or the identified one of the asset, the user, or the security threat.

In some embodiments, the security action includes one of locking an electronic asset; contacting an authorized user of the electronic asset; supplementing information associated with one of the electronic asset, the user, and the security threat; and suspending operation of at least one operation on the electronic asset.

In another aspect, embodiments relate to a computer-implemented method that includes causing at least one data store in a service provider environment to maintain at least three data sets from a plurality of data sources, each data set including information for one of assets, users, or security threats; correlating at least one entry in a first data set with a second data set of the three data sets; receiving a query associated with a subject, the subject being at least one of an asset, a user, or a security threat; determining a correlator of a set of correlators based at least in part on the subject; identifying at least one of an asset, a user, or security threat associated with the subject; and performing a security action affecting the subject and an identified one of the asset, the user, or the security threat.

In some embodiments, the method further includes identifying at least one of an asset data set, a user data set, or a threat data set from the at least three data sets, wherein the asset data set includes first identification information identifying individual devices on a network, the user data set includes second identifying information identifying user accounts associated with the individual devices, and the threat data set includes third identification information identifying threats to one of a device or a user account.

In some embodiments, the method further includes providing an asset classifier, a user classifier, and a threat classifier; using the asset classifier to classify an asset as one of a physical asset or a role asset; using the user classifier to classify a user as being associated with one of an employee type, a group type, or a role type; and using the threat classifier to classify a threat into one of a target threat, an actor threat, or an activity threat.

In some embodiments, the method further includes using one of the asset classifier, the user classifier, or the threat classifier on incoming data prior to storage in one of the at least three data stores or on data in one of the at least three data stores.

In some embodiments, the method further includes using an asset to threat correlator to correlate a threat to an asset based at least in part on vulnerability definition data; using a user to threat correlator to correlate a user to a threat; and using an asset to user correlator to correlate an asset to a user based at least in part on authentication data.

In some embodiments, the method further includes generating a report including an indication of at least one of a security action or the identified one of the asset, the user, or the security threat, wherein the security action includes one of locking an electronic asset; contacting an authorized user of the electronic asset; supplementing information associated with one of the electronic asset, the user, and the security threat; and suspending operation of at least one operation on the electronic asset.

In yet another aspect, a non-transitory computer readable storage medium stores instructions that, when executed by at least one processor of a computing system, causes the computing system to cause at least one data store in a service provider environment to maintain at least three data sets from a plurality of data sources, each data set including information for one of assets, users, or security threats; correlate at least one entry in a first data set with a second data set of the three data sets; receive a query associated with a subject, the subject being at least one of an asset, a user, or a security threat; determine a correlator of a set of correlators based at least in part on the subject; identify at least one of an asset, a user, or security threat associated with the subject; and perform a security action affecting the subject and an identified one of the asset, the user, or the security threat.

In some embodiments, the at least three data sets include at least an asset data set, a user data set, and a threat data set, and wherein the asset data set includes first identification information identifying individual devices on a network, the user data set includes second identifying information identifying user accounts associated with the individual devices, and the threat data set includes third identification information identifying threats to one of a device or a user account.

In some embodiments, the instructions of the non-transitory computer readable storage medium, when executed by the at least one processor, further enable the computing system to provide an asset classifier, a user classifier, and a threat classifier; use the asset classifier to classify an asset as one of a physical asset or a role asset; use the user classifier to classify a user as being associated with one of an employee type, a group type, or a role type; and use the threat classifier to classify a threat into one of a target threat, an actor threat, or an activity threat.

In some embodiments, the instructions of the non-transitory computer readable storage medium, when executed by the at least one processor, further enable the computing system to use an asset to threat correlator to correlate an asset to a threat based at least in part on vulnerability definition data; use a user to threat correlator to correlate a user to a threat; and use an asset to user correlator to correlate an asset to a user based at least in part on authentication data.

In some embodiments, the instructions of the non-transitory computer readable storage medium, when executed by the at least one processor, further enable the computing system to generate a report including an indication of at least one of a security action or the identified one of the asset, the user, or the security threat, wherein the security action includes one of locking an electronic asset, contacting an authorized user of the electronic asset, supplementing information associated with one of the electronic asset, the user, the security threat, suspending operation of at least one operation on the electronic asset.

BRIEF DESCRIPTION OF THE DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
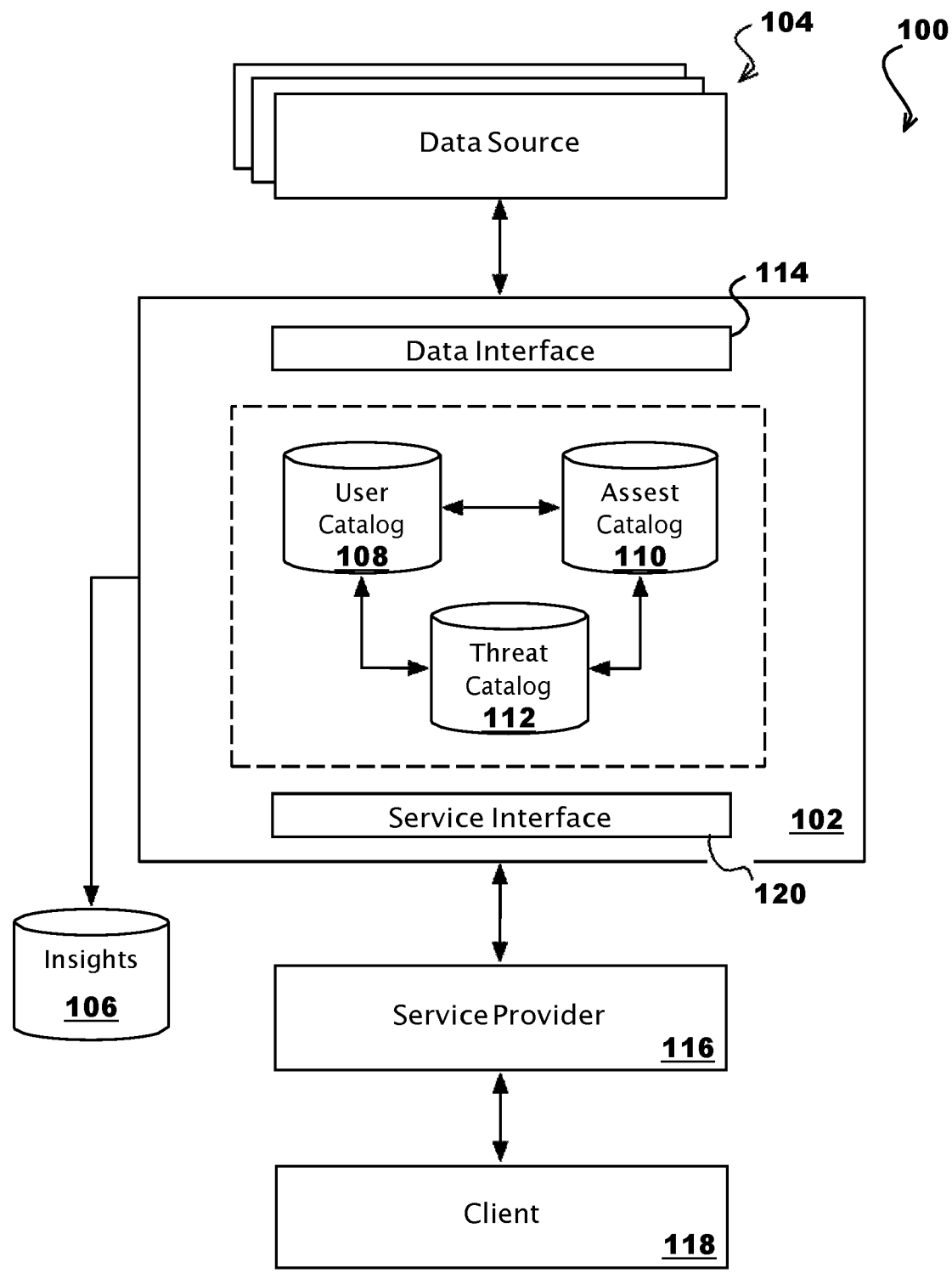
FIG. 1 illustrates a block diagram of an example threat analysis service system in accordance with an embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on nontransient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs and in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Systems and methods in accordance with various embodiments of the present disclosure may overcome one or more of the aforementioned and other deficiencies experienced in conventional approaches to detecting suspicious or unexpected activity in an electronic environment. In particular, various embodiments provide for securing an electronic environment that includes devices connected over a network, and users of those devices, by monitoring data to determine insights and other correlations between portions of the data obtained from various data sources including, for example, data for devices on the network, data for users of the devices, and data for potential security threats to the devices and/or users. A threat analysis service can obtain data for devices, users, and threats from disparate sources and can correlate users to devices and threats, to build an understanding of an electronic environment's operational, organizational, and security concerns in order to provide customized security strategies and remediations. Additionally, the threat analysis service can develop a model of an electronic environment's behavior by monitoring and analyzing various the data from the data sources. The model can be updated such that the threat analysis service can tailor its orchestration to complement existing operational processes.

Various other applications, processes, and uses are presented below with respect to the various embodiments.

FIG. 1 illustrates a block diagram 100 of an example threat analysis service system, in accordance with an embodiment. As shown in FIG. 1, a threat analysis service 102 can obtain data from data source(s) 104 and produce insights 106 based on the data sets. In accordance with various embodiments, the data can include user data sets, asset data sets, and threat data sets, among other such data. As will be described further herein, the insights can include an understanding of an electronic environment's operational, organizational, and security concerns as well as customized security strategies and remediations.

The data can be stored in various data catalogs 108, 110, 112, including data repositories, databases, or other data stores. In some embodiments, the data catalogs can include a user catalog 108, an asset catalog 110, and a threat catalog 112. Asset catalog 110 can include information for devices on a network. The information can include identification information that can be used to uniquely identify a device, device type information that can be used to identify any type of device, device log information that can be used to determine users of a device, status information that can be used to determine whether a device is active, offline, or idle; activity information that can be used to determine a rate of operation or use of a device on the network, etc. User catalog 108 can include information that associates a user to one or more devices. Threat catalog 112 can include information for security threats that can affect a user and/or an asset.

Threat analysis service 102 can include one or more data interfaces 114, 120 such as Representational State Transfer (REST) interfaces or other web interfaces, to connect to the catalogs.

Upon receipt of the data sets, threat analysis service 102 can analyze the data sets to augment the data in the catalogs. For example, in various embodiments, threat analysis service 102 can include one or more machine learning classifiers (not shown). Each classifier can be trained to classify or otherwise augment data in the data sets for incoming data prior to storage, after data storage, or a combination thereof.

Threat analysis service 102 can correlate data between the catalogs. For example, in various embodiments, threat analysis service 102 can include one or more machine learning correlators (not shown). Each correlator can be trained to correlate or otherwise relate different data characteristics. For example, the correlators can correlate an entry in user catalog 108 with an entry in asset catalog 110, an entry in user catalog 108 with an entry in threat catalog 112, or an entry in asset catalog 110 with an entry in threat catalog 112. In another example, in response to receiving user authentication data, threat analysis service 102 can correlate an asset to a user. User authentication data can include, for example, a user identifier or other identification information of a user. The user identifier can be associated with an access policy or other such policy that identifies access rights of a user, including access to one or more assets (e.g., electronic devices and/or data stored on those devices). In yet another example, in response to receiving vulnerability definition data, threat analysis service 102 can correlate a threat to one or more assets.

In accordance with various embodiments, the correlated data can be used to determine insights between the catalog information. The insights can identify properties of organizational behavior, identify behavior like timing and frequency of standard jobs (e.g., patching) as a way to develop automated remediations in line with an organization's historical patterns, supplement asset data with information such as a user's geographic location as well as inferred properties such as a user's functional role within the organization, infer the severity of a security risk from threats that are dependent on roles of users and the capabilities of the assets to which those users have access to, etc. The insights can be used to generate a report of such insights. The report can be provided to an appropriate entity for assisting in an organization's operational, organizational, and security concerns, or other such purposes. Various other such functions can be used as well within the scope of the various embodiments as would be apparent to one of ordinary skill in the art in light of the teachings and suggestions contained herein.

Security analysis service 102 can expose the insights to various service providers 116 and/or clients 118 of the service providers through one or more service interfaces 120. For example, a user can submit a query for one of an asset, a user, or a security threat. A query module (not shown) can receive the query and identify a subject or type of query. A subject can include whether the query is directed to an asset, a user, or a security threat. Security analysis service 102 can determine a correlator based on the subject of the query. For example, in the situation where the subject is a user, security analysis service 102 can utilize a user to threat correlator to search for security threats associated with the user. Thereafter, a report can be provided to the requestor.

Figure 2:
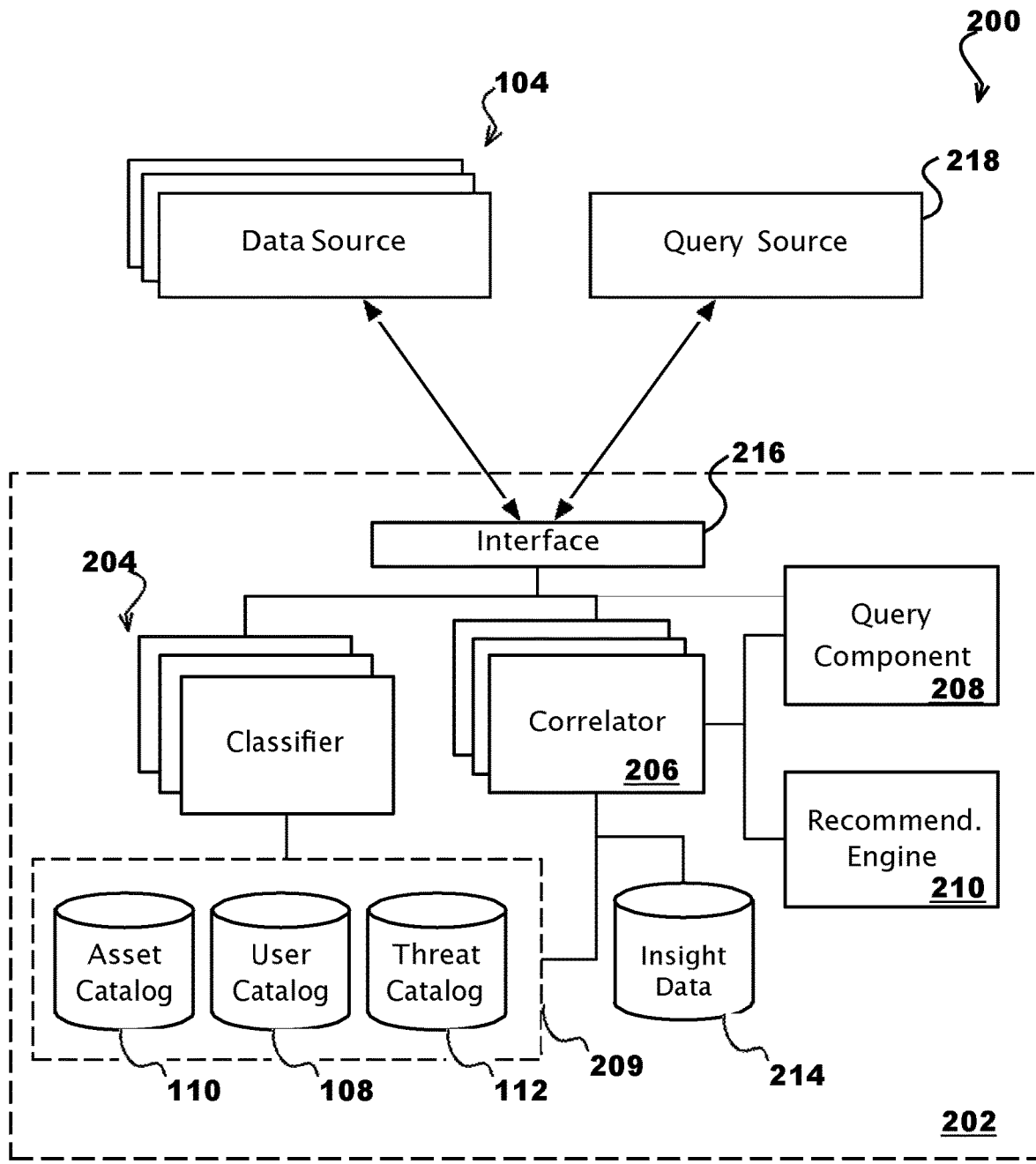
FIG. 2 illustrates a block diagram of components of a threat analysis system for generating insights from disparate data sources in accordance with an embodiment.

FIG. 2 illustrates a block diagram 200 of components of a threat analysis system for generating insights from disparate data sources in accordance with various embodiments. In this example, threat analysis system 202 (e.g., threat analysis service 102) includes classifier component(s) 204, correlator component(s) 206, query component 208, and recommendation engine 210 or other such insight recommending component. Threat analysis system 202 may also include one or more data stores 209, including, for example, user catalog data store 108, asset catalog data store 110, threat catalog data store 112, as well as an insight data store 214. It should be noted that although the data stores are shown as separate data stores, data from the data stores can be maintained across fewer or additional data stores. The data stores can be accessed by classifier components 204 and correlators 206 to obtain information in order to perform the functionality of the corresponding component. Threat analysis system 202 can be configured to communicate with at least one data source (e.g., data source(s) 104 in FIG. 1). Although threat analysis system 202 is shown in a single system, threat analysis system 202 may be hosted on multiple server computers and/or distributed across multiple systems. Additionally, the components may be performed by any number of different computers and/or systems. Thus, the components may be separated into multiple services and/or over multiple different systems to perform the functionality described herein.

Interface 216 may include any software and/or hardware components configured to send and receive communications and/or other information between the threat analysis system 202 and data source 104 and query source 218. In various embodiments, interface 216 may include a data interface and service interface such as data interface 114 in FIG. 1 and service interface 120 in FIG. 1. Interface 216 may be configured to facilitate communication between threat analysis system 202 and data source 104 and query source 218. Interface 216 may be configured to periodically receive data sets, queries, and/or any other relevant information from data source 104 and query source 218. As described, data source 104 can provide user data sets, asset data sets, threat data sets, vulnerability definition data, and authentication data, among other such data. Query source 218 can include authorized users of a service provider, e.g., security analyst, IT personal, etc., and authorized clients associated with the service provider, among other such users.

A query may include a request for information describing a relationship between users, devices, and threats. For example, the query can request information, for a given asset, concerning security threats that currently could affect the asset and a user utilizing the asset. In another example, the query can request information, for a given user, concerning security threats that could potentially target the user and assets the user utilizes. In yet another example, the query can request information, for a given security threat, concerning assets and users that could be targeted by the security threat. A query may be sent in a single message or may include a series of messages.

In some embodiments, a query can be received from query source 218 and directed to query component 208, for example, which is configured to analyze the query to attempt to determine a subject associated with the query, or at least identify a type of query from the request. The subject can include, for example, information for an asset, a user, or a security threat. Query component 208 can direct the query to an appropriate correlator component based on the subject of the query to determine information to provide in response to the query. As described, classifiers 204 can be trained to classify or otherwise augment data in user catalog data store 208, asset catalog data store 210, and threat catalog data store 212, and correlators 206 can be trained to correlate or otherwise relate different data characteristics of data in the data stores.

The information can also be provided to recommendation engine 210 which can use the information, along with any other appropriate information, to provide customized security strategies and remediations. This can take the form of remediations to reduce security risks and minimize security threats, a report including an indication of a security action or identification of an asset, a user, or a security threat responsive to the query. Additionally, or alternatively, threat analysis system 202 can automatically perform a security action or other such action. This can include, for example, locking or at least restricting access to an electronic asset, contacting an authorized user of the electronic asset, supplementing information associated with one of the electronic asset, the user, and the security threat, and suspending operation of at least one operation on the electronic asset, among other such actions. Threat analysis system 202 can then retrieve insight or other recommendation information for the recommendations from insight data store 214, or other such location, to be provided to the appropriate requesting or other user account.

Figure 3:
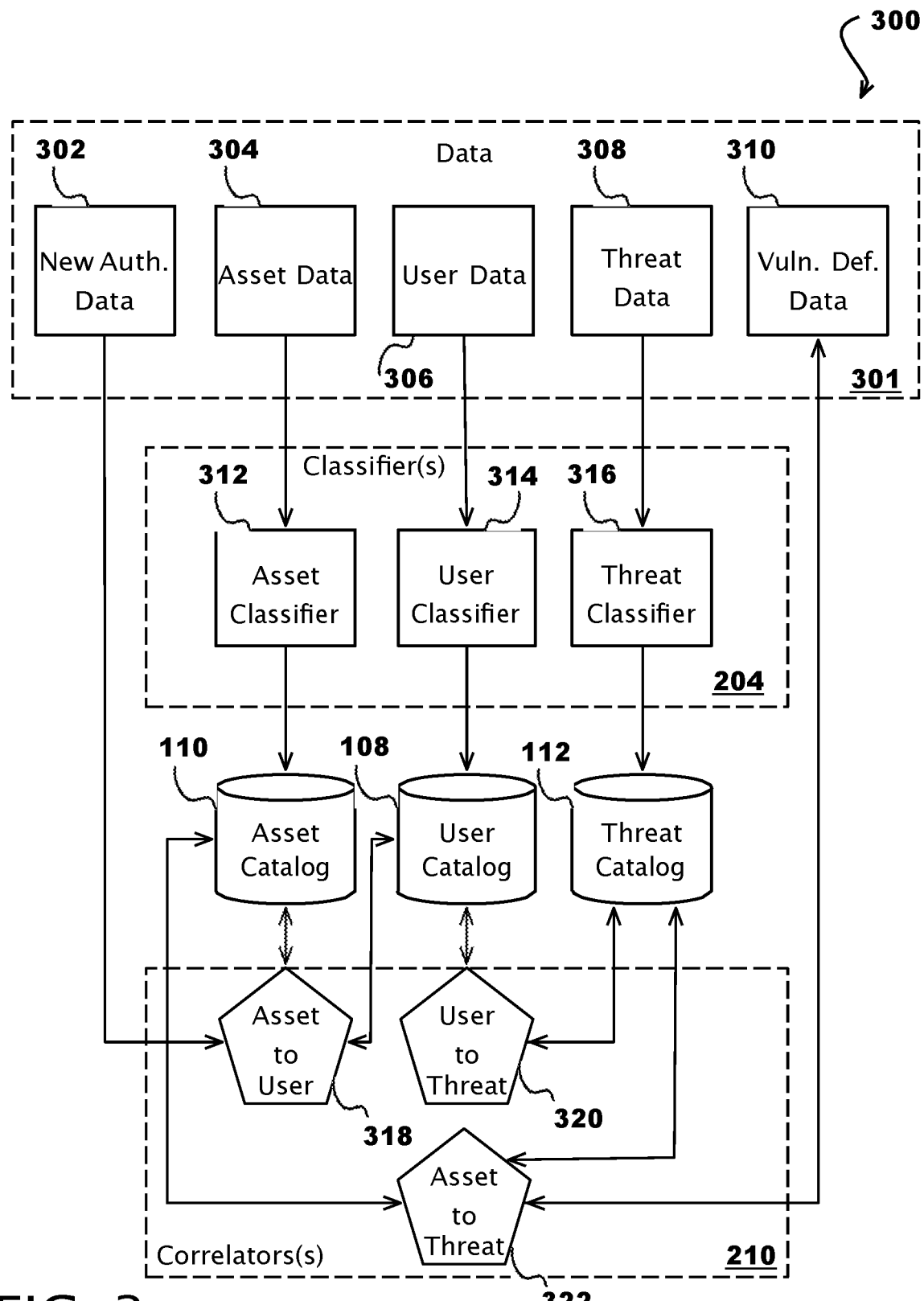
FIG. 3 illustrates a block diagram of components of a threat analysis system for correlating data from disparate resources in accordance with an embodiment.

FIG. 3 illustrates a block diagram 300 of components of a threat analysis system for correlating data from disparate resources in which various embodiments can be implemented. In this example, a threat analysis service can obtain data 301 from a number of data sources. In accordance with various embodiments, data sources can include, for example, administrators, users, threat feeds, data warehouses, published security vulnerability feeds, security devices (e.g., honeypots and other early warning systems), among other such sources. Data 301 can include various data sets of new user authentication data 302, asset data 304, user data 306, security threat data 308, and new vulnerability data 310, among other such data. New user authentication data 302 can include, for example, login credentials such as a user ID and password, a PKI certificate, tokens or biometrics or answers to personal questions that a new user must answer, among other such data. Asset data 304 can include, for example, information that identifies an electronic device, service, or other resource of a provider. User data 306 can include data from network logs, organization chart information, employment records, etc. Security threat data 308 and new vulnerability definition data 310 can include, for example, known data describing various security threats directed to users, assets, or a combination thereof, as well as data that may potentially pose a security threat to users and assets. It should be noted that other sources of data and the type of data are contemplated in accordance with the various embodiments described herein, and the data sources and data shown are for example purposes.

The data sets can be analyzed to augment the data. For example, in various embodiments, a threat analysis service can include one or more classifiers 204. The classifiers 204 may execute any suitable machine learning procedures, rule-based classification techniques, heuristic techniques, or some combination thereof. The type of classifier may vary and may depend on ease of implementation and maintenance and/or cost. Each classifier can be trained to classify or otherwise augment data in the data sets for incoming data prior to storage, after data storage, or a combination thereof, for existing and/or new data. The classifiers can include asset classifier 312, user classifier 314, and threat classifier 316, among other such classifiers. Asset classifier 312 can be trained to analyze asset data 304 to classify an asset into a physical classification or a role classification. A physical classification can include a server, a laptop, a printer, a camera, or a router, among other such electronic devices. A role classification can include software development, medical services, or finance, for example. User classifier 314 can be trained to analyze user data 306 to classify the data into employee type classifications, group classifications, role-based classifications, etc. Employee type classifications can include, for example, partner, equity partner, executive, intern, manager, or individual contributor, among other such employee types. Group classifications can include, for example, product group, research group, sales group, etc. Role-based classifications can include, for example, software developer, attorney, QA manager, support technician, etc. Threat classifier 316 can be trained to analyze data 308 to classify a security threat into target classifications, actor classifications, or activity classifications, for example. Target classifications can generally include any target, for example, people, routers, mobile devices, etc. Actor classifications can generally include any actor, including, for example, a nation state, opportunistic attackers, a mass market, script kiddies, etc. Activity classifications can include, for example, widespread and currently active, targeted and previously active, not yet active, etc.

As described, the data can be stored in various data catalogs, including data repositories, databases, or other data stores. In this example, the data catalogs can include user catalog 108, asset catalog 110, and threat catalog 112. Asset catalog 110 can include information for devices on a network. The information can include identification information that can be used to uniquely identify a device; device type information that can be used to identify any type of device; device log information that can be used to determine users of a device; status information that can be used to determine whether a device is active, offline, or idle; and activity information that can be used to determine a rate of operation or use of a device on the network. User catalog 108 can include information that associates a user to one or more devices. Threat catalog 112 can include information for security threats that can affect a user and/or an asset. In accordance with various embodiments, a threat analysis service can derive insights from the various catalogs and analytical methods to infer properties of organizational behavior. Further, a threat analysis service can implement methods to identify behavior like timing and frequency of standard jobs such as patching as a way to develop automated remediations in line with an organization's historical pattern.

For example, in accordance with various embodiments, a threat analysis service can include one or more machine learning correlators (e.g., correlators 210) to correlate data between catalogs to generate a comprehensive, up-to-date view of an organization's security stance. As shown in FIG. 3, a threat analysis service can include asset to user correlator 318, user to threat correlator 320, and asset to threat correlator 322. Asset to user correlator 318 can correlate an entry in the user catalog 108 with one or more entries in the asset catalog 110. For example, asset to user correlator 318 can identify an asset and the user(s) associated with it. A threat analysis service can then supplement a particular asset's data with information such as the user's geographic location as well as inferred properties such as the user's functional role within an organization. User to threat correlator 320 can correlate an entry in the user catalog 108 with an entry in the threat catalog 112 and asset to threat correlator 322 can correlate an entry in the asset catalog 110 with an entry in the threat catalog 112. Such correlations allow a threat analysis service to determine a risk level from security threats that are dependent on the roles of individuals and the capabilities of the assets to which those individuals have access to.

In various embodiments, in response to receiving new user authentication data 302, a threat analysis service can correlate an asset to a user using asset to user correlator 318. In another example, in response to receiving vulnerability definition data 310, a threat analysis service can correlate a threat to one or more assets using asset to threat correlator 322. Advantageously, a threat analysis service or other such service can map the information contained in the catalogs, enabling sophisticated queries and analysis than are possible with the data catalogs taken individually as described in various embodiments herein.

Figure 4:
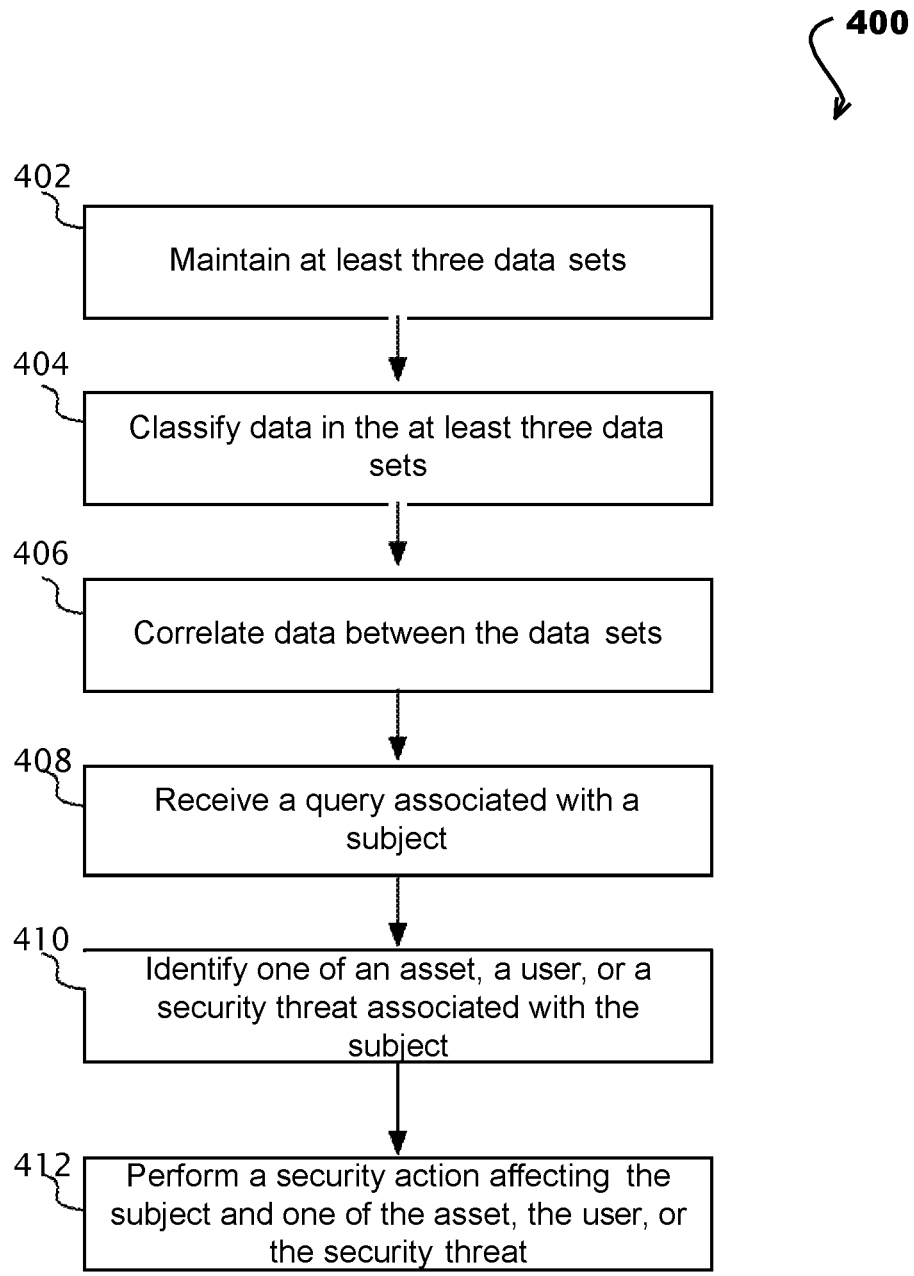
FIG. 4 illustrates an example process for generating insights from disparate data sources in accordance with various embodiments.

FIG. 4 illustrates an example process 400 for generating insights from disparate data sources in accordance with various embodiments. It should be understood that, for any process discussed herein, there can be additional, fewer, or alternative steps, performed in similar or different orders, or in parallel, within the scope of the various embodiments unless otherwise stated. In this example, at least one data store in a service provider environment maintains 402 at least three data sets from a plurality of data sources including, for example, data for devices on the network, data for users of the devices, and data for potential security threats to the devices and/or the users. The data sets can include information for one of assets, users, or security threats. The data can be stored in various data catalogs, including data repositories, databases, or other data stores. In some embodiments, the data catalogs can include a user catalog, an asset catalog, and a threat catalog. An asset catalog can include information for devices on a network. The information can include identification information that can be used to uniquely identify a device; device type information that can be used to identify any type of device; device log information that can be used to determine users of a device; status information that can be used to determine whether a device is active, offline, or idle; and activity information that can be used to determine a rate of operation or use of a device on the network. A user catalog can include information that associates a user to one or more devices. A threat catalog can include information for security threats that can affect a user and/or an asset.

The data sets can be analyzed to classify 404 the data. For example, in various embodiments, one or more machine learning classifiers can be trained to classify or otherwise augment data in the data sets for incoming data prior to storage, after data storage, or a combination thereof. The classifiers can include an asset classifier, a user classifier, or a threat classifier, among other such classifiers. An asset classifier can be trained to analyze asset data to classify an asset into a physical classification or a role classification. A user classifier can be trained to analyze user data to classify the data into employee type classifications, group classifications, role-based classifications, etc. A threat classifier can be trained to classify a security threat into target classifications, actor classifications, or activity classifications, for example.

One or more machine learning correlators can correlate 406 data between the data sets based on the classification to generate a comprehensive, up-to-date view of an organization's security stance. For example, an asset to user correlator can correlate an entry in an asset catalog with an entry in a user catalog, a user to threat catalog can correlate an entry in a user catalog with an entry in a threat catalog, and an asset to threat correlator can correlate an entry in the asset catalog with an entry in the threat catalog. Such correlations allow a threat analysis service to determine a risk level from security threats that target the roles of individuals and the capabilities of the assets to which those individuals have access.

A query associated with a subject is received 408, the subject being at least one of an asset, a user, or a security threat. The query can be an automated query or a manual query. An automated query can include system generated queries. These queries can be in response to system events. For example, an automated query can be generated in response to receiving new user authentication data, new security threat data, or other such data. A manual query can include a query from a system or service, a user, an administrator, etc. Once a query is received, a correlator of a set of correlators is identified 410 based at least in part on the subject. For example, the query can be associated with a subject. The query can be analyzed to identify the subject. In accordance with various embodiments, the subject can be related to an asset, a user, or a security threat. For example, the subject can include information such as an identifier or other data associated with a particular asset, user, or security threat. In step 410, mapping information, such as a lookup table, can be used to tag or otherwise identify at least one of an asset, a user, or security threat associated with the subject. Step 410 may be accomplished by reading out or otherwise reviewing the data provided by the machine learning correlators in step 406, for example. A security action affecting the subject and an identified asset, user, or security threat that is based on the identified asset, user, or security threat associated with the subject is performed in step 412. For example, the mapping information can be used to determine insights between the catalog information based on at least one of the asset, the user, or the security threat associated with the subject. The insights can identify properties of organizational behavior, identify behavior like timing and frequency of standard jobs (e.g., patching) as a way to develop automated remediations in line with an organization's historical pattern, supplement asset data with information such as a user's geographic location as well as inferred properties such as a user's functional role within the organization, infer the severity of a security risk from threats that are dependent on roles of users and the capabilities of the assets to which those users have access to, etc. The insights can be used to generate a report of such insights. The report can be provided to an appropriate entity for assisting in an organization's operational, organizational, and security concerns, or other such purposes.

Figure 5:
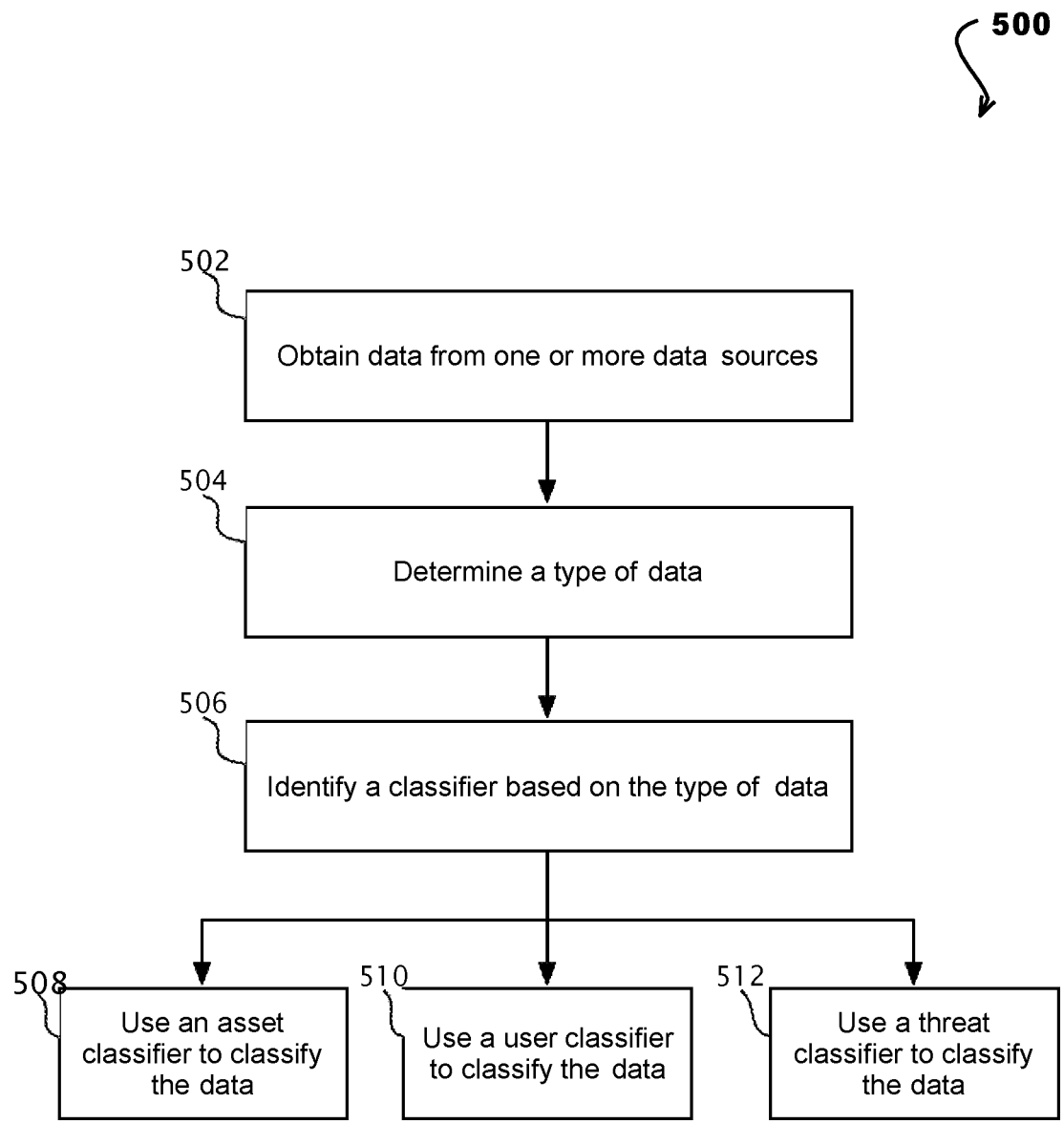
FIG. 5 an example process for classifying data from disparate data sources that can be utilized in accordance with various embodiments.

FIG. 5 illustrates an example process 500 for classifying data from disparate data sources that can be utilized in accordance with various embodiments. In this example, data is obtained 502 from one or more data sources. The data is analyzed to determine 504 a type or subject of the data. For example, the type can include, for example, an asset type, a user type, or a security threat type. A determination is made based on the type of data to identify 506 an appropriate classifier to analyze the data. The data can be analyzed to augment the data. For example, in the situation where the type of data is an asset, an asset classifier can be used 508 to classify an asset identified by the data into a physical classification or a role classification. In the situation where the type of data is a user, a user classifier can classify 510 a user identified by the data into employee type classifications, group classifications, role-based classifications, etc. In the situation where the type of data is a security threat, a threat classifier can classify 512 a security threat identified by the data into target classifications, actor classifications, or activity classifications, for example. Thereafter, the classified data can be stored in an appropriate catalog as described herein.

Figure 6:
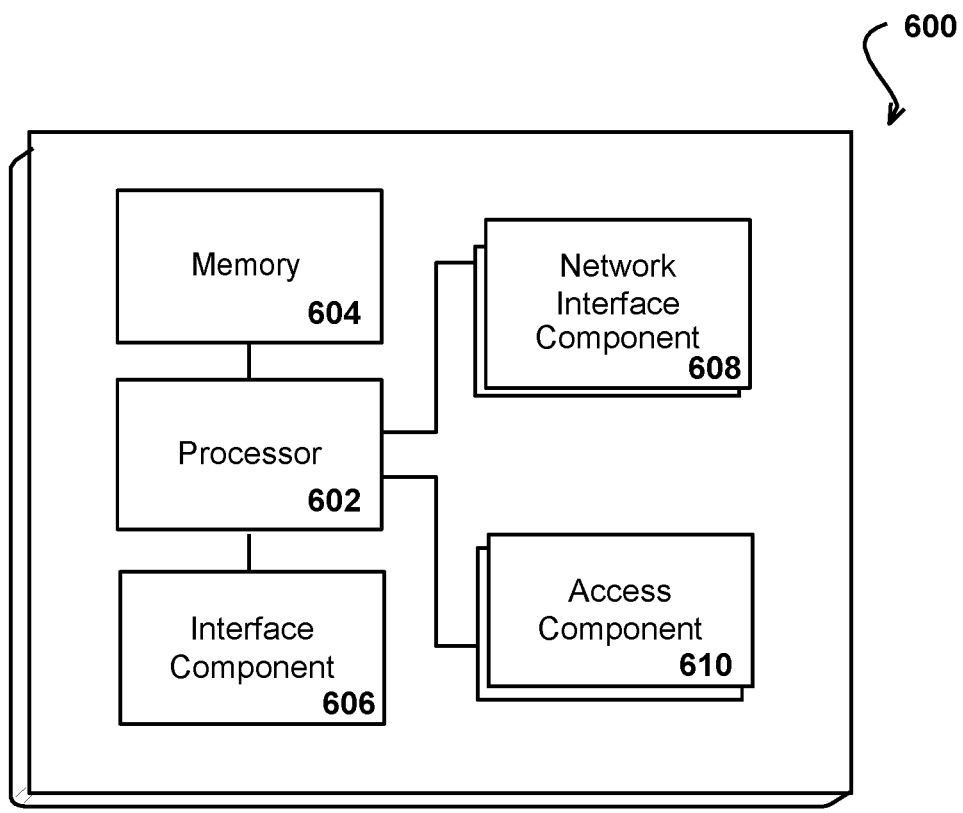
FIG. 6 illustrates example components of a computing device configured for implementing aspects in accordance with various alternate embodiments.

FIG. 6 illustrates an example set of basic components of a computing device 600 in accordance with various embodiments. In this example, the device includes at least one central processor 602 for executing instructions that can be stored in at least one memory device or element 604. As would be apparent to one of ordinary skill in the art, the device can include many types of memory, data storage or computer-readable storage media, such as a first data storage for program instructions for execution by the processor 602, the same or separate storage can be used for images or data, a removable storage memory can be available for sharing information with other devices, etc. As described herein, the instructions, when executed by the processor, can enable processor to cause at least one data store in a service provider environment to maintain at least three data sets from a plurality of data sources, each data set including information for one of assets, users, or security threats, correlate at least one entry in a first data set with a second data set of the three data sets, receive a query associated with a subject, the subject being at least one of an asset, a user, or a security threat, determine a correlator of a set of correlators based at least in part on the subject, identify at least one of an asset, a user, or security threat associated with the subject; and perform a security action affecting the subject and an identified one of the asset, the user, or the security threat.

The device in some embodiments will include some type of display element 606, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. The display screen can display insights and other information described herein.

As discussed, the device can include one or more networking components 608 enabling the computing device to communicate over one or more networks, whether wired and/or wireless. The example device can also include at least one additional input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A computing system, comprising:
    at least one computing device processor;
    a memory device including instructions that, when executed by the at least one computing device processor, enables the computing system to:
        cause at least one data store in a service provider environment to maintain at least three data sets from a plurality of data sources, each data set including information for one of assets, users, or security threats associated with a network of computing assets;
        use a machine learning asset classifier in the service provider environment to classify an asset in a first one of the three data sets as one of a physical asset or a role asset;
        use a machine learning user classifier in the service provider environment to classify a user in a second one of the three data sets as being associated with one of an employee type, a group type, or a role type;
        use a machine learning threat classifier in the service provider environment to classify a threat in a third one of the three data sets into one of a target threat, an actor threat, or an activity threat;
        correlate entries among the three data sets;
        receive a query associated with a subject, the subject being at least one of an asset classification, a user classification, or a security threat classification;
        identify one or more assets, users, or security threats associated with the subject;
        execute a threat analysis service to:
            select, based on the subject of the query, a machine learning correlator from a plurality of machine learning correlators implemented by the computing system; and
            use the selected machine learning correlator to infer a property of the network based on a correlation of data between:
                one or more assets and one or more users,
                one or more assets and one or more security threats, or
                one or more users and one or more security threats; and
        perform a security action affecting the subject and the identified one or more assets, users, or security threats based on the inferred property of the network.

2. The computing system of claim 1, wherein the instructions, when executed by the at least one computing device processor, further enables the computing system to provide:
    an interface configured to obtain the at least three data sets, wherein the at least three data sets include at least an asset data set, a user data set, and a threat data set, and wherein the asset data set includes first identification information identifying individual devices on a network, the user data set includes second identifying information identifying user accounts associated with the individual devices, and the threat data set includes third identification information identifying threats to one of a device or an user account.

3. The computing system of claim 1, wherein the machine learning asset classifier classifies different types of physical devices as a physical asset and different types of functional roles as a role asset.

4. The computing system of claim 1, wherein at least one of the machine learning asset classifier, the machine learning user classifier, or the machine learning threat classifier is applied to incoming data prior to storage in one of the at least three data sets.

5. The computing system of claim 1, wherein at least one of the machine learning asset classifier, the machine learning user classifier, or the machine learning threat classifier is applied to data in one of the at least three data sets.

6. The computing system of claim 1, wherein the correlation of the entries is performed based on the classifications performed by at least one of the machine learning asset classifier, the machine learning user classifier, or the machine learning threat classifier.

7. The computing system of claim 1, wherein the plurality of machine learning correlators includes one or more of:
an asset to threat correlator that utilizes vulnerability definition data to correlate an asset to a threat;
a user to threat correlator that correlates a user to a threat; and
an asset to user correlator that uses at least authentication data to correlate an asset to a user.

8. The computing system of claim 1, wherein the instructions, when executed by the at least one computing device processor, further enables the computing system to provide:
an insight recommending component configured to generate a report including an indication of at least one of a security action or the identified one of the asset, the user, or the security threat.

9. The computing system of claim 8, wherein the security action includes one of locking an electronic asset; contacting an authorized user of the electronic asset; supplementing information associated with one of the electronic asset, the user, and the security threat; and suspending operation of at least one operation on the electronic asset.

10. A computer-implemented method, comprising:
causing at least one data store in a service provider environment to maintain at least three data sets from a plurality of data sources, each data set including information for one of assets, users, or security threats associated with a network of computing assets;
using a machine learning asset classifier in the service provider environment to classify an asset in a first one of the three data sets as one of a physical asset or a role asset:
using a machine learning user classifier in the service provider environment to classify a user in a second one of the three data sets as being associated with one of an employee type, a group type, or a role type;
using a machine learning threat classifier in the service provider environment to classify a threat in a third one of the three data sets into one of a target threat, an actor threat, or an activity threat;
correlating entries among the three data sets;
receiving a query associated with a subject, the subject being at least one of an asset classification, a user classification, or a security threat classification;
executing a threat analysis service, the execution including:
selecting, based on the subject of the query, a machine learning correlator from a plurality of machine learning correlators;
using the selected machine learning correlator to infer a property of the network based on a correlation of data between:
one or more assets and one or more users,
one or more assets and one or more security threats, or
one or more users and one or more security threats; and
identifying one or more assets, users, or security threats associated with the subject; and
performing a security action affecting the subject and the identified one or more assets, users, or security threats based on the inferred property of the network.

11. The computer-implemented method of claim 10, further comprising:
identifying at least one of an asset data set, a user data set, or a threat data set from the at least three data sets, wherein the asset data set includes first identification information identifying individual devices on a network, the user data set includes second identifying information identifying user accounts associated with the individual devices, and the threat data set includes third identification information identifying threats to one of a device or a user account.

12. The computer-implemented method of claim 10, wherein the machine learning asset classifier classifies different types of physical devices as a physical asset and different types of functional roles as a role asset.

13. The computer-implemented method of claim 10, further comprising:
using one of the machine learning asset classifier, the machine learning user classifier, or the machine learning threat classifier on incoming data prior to storage in one of the at least three data sets or on data on one of the at least three data sets.

14. The computer-implemented method of claim 10, wherein the plurality of machine learning correlators includes one or more of:
an asset to threat correlator that correlates a threat to an asset based at least in part on vulnerability definition data;
a user to threat correlator that correlates a user to a threat; and
an asset to user correlator that correlates an asset to a user based at least in part on authentication data.

15. The computer-implemented method of claim 10, further comprising:
generating a report including an indication of at least one of a security action or the identified one of the asset, the user, or the security threat, wherein the security action includes one of locking an electronic asset; contacting an authorized user of the electronic asset; supplementing information associated with one of the electronic asset, the user, and the security threat; and suspending operation of at least one operation on the electronic asset.

16. A non-transitory computer readable storage medium storing instructions that, when executed by at least one processor of a computing system, causes the computing system to:
cause at least one data store in a service provider environment to maintain at least three data sets from a plurality of data sources, each data set including information for one of assets, users, or security threats associated with a network of computing assets;
use a machine learning asset classifier in the service provider environment to classify an asset in a first one of the three data sets as one of a physical asset or a role asset:
use a machine learning user classifier in the service provider environment to classify a user in a second one of the three data sets as being associated with one of an employee type, a group type, or a role type;
use a machine learning threat classifier in the service provider environment to classify a threat in a third one of the three data sets into one of a target threat, an actor threat, or an activity threat;

correlate entries among the three data sets;
receive a query associated with a subject, the subject being at least one of an asset classification, a user classification, or a security threat classification;
identify one or more assets, users, or security threats associated with the subject;
execute a threat analysis service to:
  select, based on the subject of the query, a machine learning correlator from a plurality of machine learning correlators;
  use the selected machine learning correlator to infer a property of the network based on a correlation of data between:
    one or more assets and one or more users,
    one or more assets and one or more security threats, or
    one or more users and one or more security threats; and
  perform a security action affecting the subject and the identified one or more assets, users, or security threats based on the inferred property of the network.

17. The non-transitory computer readable storage medium of claim 16, wherein the at least three data sets include at least an asset data set, a user data set, and a threat data set, and wherein the asset data set includes first identification information identifying individual devices on a network, the user data set includes second identifying information identifying user accounts associated with the individual devices, and the threat data set includes third identification information identifying threats to one of a device or an user account.

18. The non-transitory computer readable storage medium of claim 16, wherein the correlation of the entries is performed based on the classifications performed by at least one of the machine learning asset classifier, the machine learning user classifier, or the machine learning threat classifier.

19. The non-transitory computer readable storage medium of claim 16, wherein the plurality of machine learning correlators includes one or more of:
  an asset to threat correlator that correlates an asset to a threat based at least in part on vulnerability definition data;
  a user to threat correlator that correlates a user to a threat; and
  an asset to user correlator that correlates an asset to a user based at least in part on authentication data.

20. The non-transitory computer readable storage medium of claim 16, wherein the instructions, when executed by the at least one processor, further enables the computing system to:
  generate a report including an indication of at least one of a security action or the identified one of the asset, the user, or the security threat, wherein the security action includes one of locking an electronic asset, contacting an authorized user of the electronic asset, supplementing information associated with one of the electronic asset, the user, the security threat, suspending operation of at least one operation on the electronic asset.

* * * * *